US012783739B2

(12) United States Patent
Huang et al.

(10) Patent No.: US 12,783,739 B2
(45) Date of Patent: Nov. 3, 2026

(54) PERIPHERAL DEVICE CONNECTIONS RESPONSIVE TO IDENTIFICATION DATA MATCHING

(71) Applicant: Hewlett-Packard Development Company, L.P., Spring, TX (US)

(72) Inventors: Tsue-Yi Huang, Taipei City (TW); Kang-Ning Feng, Taipei City (TW); Chia-Cheng Lin, Taipei City (TW); Chao-Shen Chen, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 277 days.

(21) Appl. No.: 18/246,657

(22) PCT Filed: Sep. 30, 2020

(86) PCT No.: PCT/US2020/053435
§ 371 (c)(1),
(2) Date: Mar. 24, 2023

(87) PCT Pub. No.: WO2022/071934
PCT Pub. Date: Apr. 7, 2022

(65) Prior Publication Data

US 2023/0359775 A1 Nov. 9, 2023

(51) Int. Cl.
*H04L 29/06* (2006.01)
*G06F 13/40* (2006.01)
*G06F 21/73* (2013.01)

(52) U.S. Cl.
CPC .......... *G06F 21/73* (2013.01); *G06F 13/4045* (2013.01); *G06F 13/4081* (2013.01)

(58) Field of Classification Search
CPC ... G06F 21/73; G06F 13/4045; G06F 13/4081
See application file for complete search history.

(56) References Cited

U.S. PATENT DOCUMENTS

| | | | | |
|---|---|---|---|---|
| 5,463,742 | A | 10/1995 | Kobayashi | |
| 5,826,043 | A | 10/1998 | Smith et al. | |
| 8,275,924 | B2 | 9/2012 | Krueger et al. | |
| 9,898,040 | B2 | 2/2018 | Sikdar | |
| 2001/0016905 | A1 | 8/2001 | Kasamatsu et al. | |
| 2011/0246756 | A1* | 10/2011 | Smith | H04L 9/32 713/170 |

(Continued)

FOREIGN PATENT DOCUMENTS

JP 2001-229117 A 8/2001

*Primary Examiner* — Wasika Nipa
(74) *Attorney, Agent, or Firm* — Quarles & Brady LLP

(57) ABSTRACT

In an example in accordance with the present disclosure, a compute device is described. The compute device includes a host controller to 1) receive identification data of peripheral devices coupled to a computing dock and 2) compare the identification data with values stored in a database. A stored value indicates a combination of peripheral devices previously coupled to the computing dock. The compute device also includes a device connection controller to, responsive to the identification data matching a stored value, retrieve operational data for the peripheral devices from the database. The device connection controller is also to connect the compute device with the peripheral devices based on operational data retrieved from the database.

18 Claims, 7 Drawing Sheets

(56) References Cited

U.S. PATENT DOCUMENTS

| | | | | |
|---|---|---|---|---|
| 2011/0264828 | A1 | 10/2011 | Zeung et al. | |
| 2014/0351478 | A1* | 11/2014 | Lee | H04W 4/08<br>710/303 |
| 2015/0227739 | A1* | 8/2015 | Russello | G06F 1/1647<br>726/19 |
| 2015/0241920 | A1 | 8/2015 | Kakani | |
| 2020/0220783 | A1* | 7/2020 | Michaud | H04L 41/344 |

* cited by examiner

PERIPHERAL DEVICE CONNECTIONS RESPONSIVE TO IDENTIFICATION DATA MATCHING

BACKGROUND

Compute devices can be connected to any number of peripheral devices to increase their functionality. For example, a monitor or multiple monitors may be coupled to a compute device to provide a visual interface for the user. As another example, an input device such as a mouse, keyboard, touch pad, etc. may be coupled to the compute device. As yet another example, the peripheral device may add functionality to the compute device. Examples of functionality-adding peripheral devices include a storage device, a scanner, a printer, and/or a projector.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
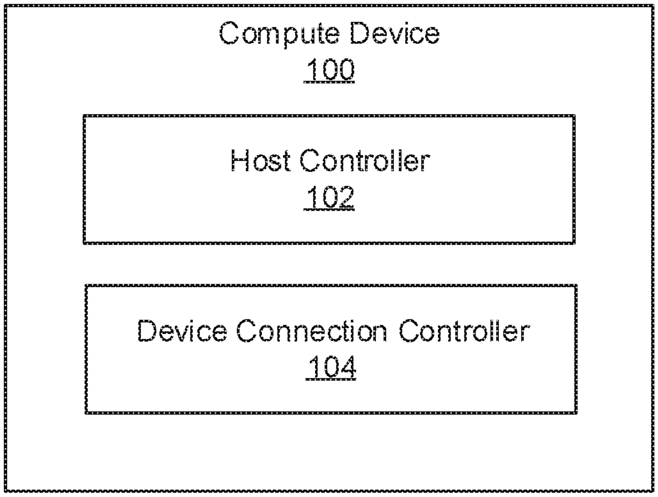
FIG. 1 is a block diagram of a compute device for peripheral device connection responsive to identification data matching, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations that coincide with the description; however, the description is not limited to the examples and/or implementations provided in the drawings.

DETAILED DESCRIPTION

Peripheral devices connect to a compute device to augment the performance of the compute device. Peripheral devices may be of a variety of types. For example, peripheral devices may be input devices such as a microphone, a keyboard, a mouse, and others. In some examples, a peripheral device may be an output device such as a monitor, a projector, or a virtual reality headset. In yet another example, the peripheral device may be an external memory device. While specific reference is made to a few example peripheral devices, there are a wide variety of peripheral devices that could be coupled to a compute device and the list of peripheral devices is sure to expand over time.

In some examples, rather than coupling each peripheral device to a compute device, a computing dock may be used. The computing dock may include peripheral ports to receive connectors from a variety of peripheral devices. The computing dock may also include a host port by which the host compute device may be connected to the dock and any connected peripheral device.

In some examples, a user may disconnect the compute device from the computing dock and, thereby, disconnect from peripheral devices connected to the dock. For example, a user may disconnect a laptop computer from a computing dock and transport the laptop computer to a meeting. In this example, upon return and reconnection of the laptop computer to the computing dock, each peripheral device may be re-enumerated and re-initialized. That is, the compute device may again determine which peripheral devices are connected and retrieve the operational data that allows the peripheral devices to communicate with and operate alongside the compute device. This may occur even when the combination of peripheral devices has not changed from when the compute device was initially disconnected.

Executing a full enumeration and full initialization operation for each peripheral device each time a compute device is reconnected may overburden the computing dock and/or the compute device, increase processing resource utilization, be an annoyance to the user, and may result in faulty detection of certain peripherals devices. For example, some peripheral devices may take more time to initialize than the compute device and device driver allow. For example, when a monitor plugged into a computing dock is not connected to a compute device, the monitor may enter a sleep mode. Once the host is connected to the computing dock, the monitor may wake up to an active mode. However, if the monitor resume time is at a particular value, the monitor may return to the sleep mode before the compute device can identify the monitor. This may be due to the detection signal routing first through the computing dock and then to the monitor. Initialization of a universal serial bus (USB) device is presented as another example. During the USB initialization process, a driver may reset the USB device. If the resume time of this USB device is of a certain value, then the USB device may also return to a sleep mode before the compute device can detect the USB device through the computing dock.

Accordingly, the present compute device, method, and machine-readable storage medium provide for a dock connection operation that bypasses a full enumeration and initialization operation when the arrangement of peripheral devices remains the same before and after the compute device was disconnected and re-connected.

Specifically, the present specification describes a shortened docking operation which does not include a full enumeration and initialization operation each time a host device is plugged into a computing dock. In a particular example, a dock controller detects the peripheral devices plugged into the dock and hashes the identification data of each peripheral together into a single hashed string. A database of the compute device stores the hashed identification data and the operational data for the peripheral devices. The host controller compares the received hashed identification data with hashed identification data stored in the database, which stored information indicates combinations of peripheral devices for which operational data has already been collected from the peripheral devices and is stored in the database. The host controller directs a device connection controller to run either a full enumeration and initialization operation or a shortened operation. If the received hashed identification data matches with the hashed identification data stored in the database, the device connection controller executes the shortened operation where operational data is retrieved from the database as opposed to from the peripheral devices themselves. Retrieval of the operational data from the peripheral devices may be a more time-consuming process such that retrieval of this information from the database results in a quicker docking and identification operation which also consumes less processing bandwidth.

In the shortened operation, the device connection controller identifies the peripheral devices that are plugged in, retrieves operational data from the database, and replies to device drivers directly. If the received identification data does not match the data stored in the database, the device connection controller performs the full enumeration and initialization operation, which is protocol-specific and includes a series of communications between the peripheral devices and the compute device. During the full enumeration and initialization operation, the host controller stores the received hashed identification data and operational data into the database such that it may be used in a subsequent shortened docking operation.

Specifically, the present specification describes a compute device. The compute device includes a host controller. The host controller receives identification data of peripheral devices coupled to a computing dock. The host controller also compares the identification data with values stored in a database. A stored value indicates a combination of peripheral devices previously coupled to the computing dock. The compute device also includes a device connection controller to, responsive to the identification data matching a stored value, retrieve operational data for the peripheral devices from the database. The device connection controller also is to connect with the peripheral devices based on operational data retrieved from the database.

The present specification also describes a method. According to the method, a host controller receives hashed identification data of peripheral devices coupled to a computing dock. The host controller also compares the hashed identification data with values stored in a database. As noted above, a stored value indicates a combination of peripheral devices previously coupled to the computing dock. Responsive to the hashed identification data matching a stored value, the device connection controller bypasses retrieval of operational data from the peripheral devices and instead retrieves the operational data for the peripheral devices from the database. The device connection controller then connects the compute device with the peripheral devices based on operational data retrieved from the database.

The present specification also describes a non-transitory machine-readable storage medium encoded with instructions executable by a processor. The machine-readable storage medium includes instructions to, when executed by the processor, cause the processor to receive hashed identification data of peripheral devices coupled to a computing dock and compare the hashed identification data with values stored in a database, wherein a stored value indicates a combination of peripheral devices previously coupled to the computing dock. Responsive to the hashed identification data matching a stored value, the instructions, when executed by the processor, cause the processor to 1) bypass retrieval of operational data from the peripheral devices, 2) retrieve operational data for the peripheral devices from the database, and 3) connect with the peripheral devices based on operational data retrieved from the database.

Responsive to the hashed identification data not matching a stored value, the instructions, when executed by the processor, cause the processor to 1) retrieve operational data for the peripheral devices from the peripheral devices, 2) connect with the peripheral devices based on operational data retrieved from the peripheral devices, 3) store, to the database, hashed identification data and operational data retrieved from the peripheral devices, and 4) purge the database of previously stored hashed identification data and operational data.

In summary, using such a compute device, method, and machine-readable storage medium may, for example, 1) expedite a docking operation when a configuration of peripheral devices connected to the computing dock do not change and 2) avoids a lack of detection of connected peripheral devices which may result due to the intermediary computing dock. However, it is contemplated that the devices disclosed herein may address other matters and deficiencies in a number of technical areas, for example.

As used in the present specification and in the appended claims, the term "identification data," refers to at least one datum about a peripheral device that identifies the peripheral device. For example, identification data may include a peripheral device identifier, a vendor identifier, a device serial number, or a device name. Note that the identification data is separate from the operational data. In one example, identification data refers to at least one datum. In one example, identification data refers to multiple data.

Accordingly, as used in the present specification and in the appended claims, the term "operational data," refers to data that allows a peripheral device to communicate and operate with a coupled compute device. Note that the operational data may be protocol specific. As a particular example, operational data fora monitor may include a protocol version (i.e., DISPLAYPORT™ 1.2 or DISPLAYPORT™ 1.4), extended display identification data (EDID) data, bandwidth, etc. As another example, peripheral component interconnect express (PCIe) operational data may include a PCIe device address, resource allocations and device-specific settings the PCIe configuration space. As yet another example, universal serial bus (USB) operation data may include a USB type, supported protocols, a transmission speed, class/subclass code, and vendor identification. While particular reference is made to certain types of operational data, other forms of operational data may exist. Note that the operational data is separate from the identification data.

Further, as used in the present specification and in the appended claims, the term "enumeration" refers to the identification of peripheral devices coupled to the computing dock. A full enumeration operation may include retrieving a count of connected peripheral devices, retrieving device information, and freeing memory for use by the enumerated peripheral devices.

Even further, as used in the present specification and in the appended claims, the term "initialization" refers to a sequence of operations to allow the peripheral device to operate alongside the compute device. In such an operation, the compute device requests operational data from the peripheral device and has to wait for the peripheral device to comply with the request.

Further, as used in the present specification and in the appended claims, the term, "controller" includes a processor and memory. The processor includes the circuitry to retrieve executable code from the memory and execute the executable code. As specific examples, the controller as described herein may include machine-readable storage medium, machine-readable storage medium and a processor, an application-specific integrated circuit (ASIC), a semiconductor-based microprocessor, a central processing unit (CPU), and a field-programmable gate array (FPGA), and/or other hardware device.

As used in the present specification an in the appended claims, the term “memory” includes a non-transitory storage medium, which machine-readable storage medium may contain, or store machine-usable program code for use by or in connection with an instruction execution system, apparatus, or device. The memory may take many forms including volatile and non-volatile memory. For example, the memory may include Random-Access Memory (RAM), Read-Only Memory (ROM), optical memory disks, and magnetic disks, among others. The executable code may, when executed by the respective component, cause the component to implement at least the functionality described herein. The memory may include a single memory element or multiple memory elements.

As used in the present specification and in the appended claims, the term “a number of” or similar language is meant to be understood broadly as any positive number including 1 to infinity.

Further as used in the present specification and in the appended claims, the term compute device refers to a compute device which contains resources to execute an operating system. In an example, the compute device may be a host device.

Turning now to the figures, FIG. 1 is a block diagram of a compute device (100) for peripheral device connection responsive to identification data matching, according to an example of the principles described herein. The compute device (100) may be of a variety of types. For example, the compute device (100) may be a mobile phone, a desktop computer, a laptop computer, a server, a tablet device and a gaming system. While particular reference is made to specific compute devices (100), the principles described herein may be implemented in a variety of different kinds of compute devices (100). As described, the compute device (100) may be plugged into a computing dock to facilitate a connection to multiple peripheral devices. That is, rather than individually connecting each peripheral device to the compute device (100), a single connection may exist between the compute device (100) and the computing dock. However, in such a scenario, each time the compute device (100) is reconnected to the computing dock, each peripheral device is subject to a full enumeration and initialization cycle. That is, the operating system may trigger a device manager to check what kind of devices are plugged into the computing dock and triggers corresponding bus drivers (e.g., a PCIe driver or USB driver) to enumerate and initialize each peripheral device and then connect each peripheral device to the compute device (100). This may occur even when the combination of peripheral devices connected to the computing dock has not changed. Such a full enumeration and initialization process may be time-consuming and redundant when the combination of peripheral devices has not changed. Accordingly, the present compute device (100) provides for a shortened docking process when the combination of peripheral devices has not changed.

Specifically, the compute device (100) includes a host controller (102). The host controller (102) receives identification data of peripheral devices that are coupled to a computing dock and compares the identification data with values stored in a database. In this example, a stored value indicates a combination of peripheral devices that were previously coupled to the computing dock and for which operational data has been collected. In some examples, reception of this data is responsive to the compute device (100) being coupled to a computing dock.

As described above, the identification data identifies the peripheral devices that are connected to the computing dock and may include such things as a peripheral device identifier, a vendor identifier, a device serial number, and a device name. In some examples, the identification data may unencrypted. In another example, the identification data may be a hashed value. Such a hash may encrypt the identification data thus preventing a tampering of that information. In some examples, the hashed identification data may represent the identification data for each peripheral device combined into a single hashed string. For example, if connected peripheral devices include a monitor, a mouse, speakers, a keyboard, and a printer, a single hashed string may be generated that identifies each of these peripheral devices. In another example, the hashed identification data may include the identification data for each peripheral device as a distinct hashed string. Continuing the example above, the monitor may have a hashed identification string, the mouse may have a separate hashed identification string, the speakers may have a separate hashed identification string, the keyboard may have a separate hashed identification string, and the printer may have a separate hashed identification string.

In either case, the identification data, be it hashed or not, is compared against stored identification data in a database. In some examples, the database is located on the compute device (100). In some examples, the database may be located remotely, but accessible to the compute device (100) via a network connection. The database may include identification data for combinations of peripheral devices that have previously been connected to the computing dock. For example, the single hashed string may indicate the monitor, mouse, speakers, keyboard, and printer that have simultaneously been coupled to the computing dock. A match between received identification data and stored information indicates that the combination of peripheral devices currently connected to the computing dock matches a combination of peripheral devices that was previously connected to the computing dock. In this example, the shortened docking operation may be trigger.

A mismatch between the received identification data and a stored value indicates there is a difference between the peripheral devices that are currently connected to the computing dock and a combination of peripheral devices that was previously connected to the computing dock. For example, suppose a user has a first monitor, mouse, and keyboard connected to a computing dock. In this example, identification data may identify the first monitor, mouse, and keyboard. After disconnecting a laptop from the computing dock, the user may replace a first monitor with a second monitor. In this example, upon reconnection of the laptop to the computing device, the host controller (102) may receive identification data for the second monitor, mouse, and keyboard. As the peripheral device combination has changed, the identification data would not match the stored value. As the identification data has changed, (e.g. one peripheral device was switched), then the shortened connection operation is not triggered and a full enumeration and initialization operation is executed.

The compute device (100) includes a device connection controller (104) to, responsive to the identification data matching a stored value, retrieve operational data for the peripheral devices from the database. That is, during a full enumeration and initialization operation, the compute device (100) may retrieve the enumeration and operational data from the peripheral device itself, which may include the calling of functions to communicate with the peripheral device. This process may be lengthy and if performed for each peripheral device each time the compute device (100) is disconnected and reconnected, may be unduly burdensome on the processing resources of the compute device (100). However, when the received identification data, which may be hashed, matches a stored value the operational data may be retrieved from the database, which may be a quicker operation and may not involve the calling of functions to request data from the peripheral devices. In other words, retrieving the operational data from the database bypasses retrieving the operational data from the peripheral devices. Moreover, in some examples, an expedited, or partial enumeration is performed where less than all the full enumeration operations are performed. For example, a partial enumeration may not perform any device information retrieval.

Specifically, the device connection controller (104) includes an interface which can communicate with the peripheral device drivers to facilitate communication between the device drivers and the respective peripheral devices. In this example, the device connection controller (104) notifies the different device drivers that a respective peripheral device is connected. The device connection controller (104) also retrieves the operational data from the database and replies to the device drivers directly instead of performing a full enumeration and initialization where such information would be collected through a laborious process with each peripheral device.

The device connection controller (104) also connects the compute device (100) with the peripheral devices based on operational data retrieved from the database.

In summary, the compute device (100) may include driver(s) to enumerate the peripheral devices. In some examples, these driver(s) perform some initialization operations and provide bus level protocol for communication. The driver(s) also include device driver(s) to manage the peripheral devices. A device driver can communicate with the peripheral devices directly or through a bus driver to read from/write to the peripheral device. The device drivers also provide another protocol for other drivers to communicate with the peripheral device. The driver(s) may differ peripheral device and/or communication protocol. For example, a USB peripheral device may be detected by a USB hub driver and may be enumerated by a USB bus driver.

In the present specification, the device connection controller (104) may be viewed as a helper driver for the bus and device drivers of the compute device (100). That is, the device connection controller (104) may include an interface which can communicate with all drivers, whether those drivers be bus drivers, device drivers, or other drivers involved in enumeration and initialization processes.

Figure 2:
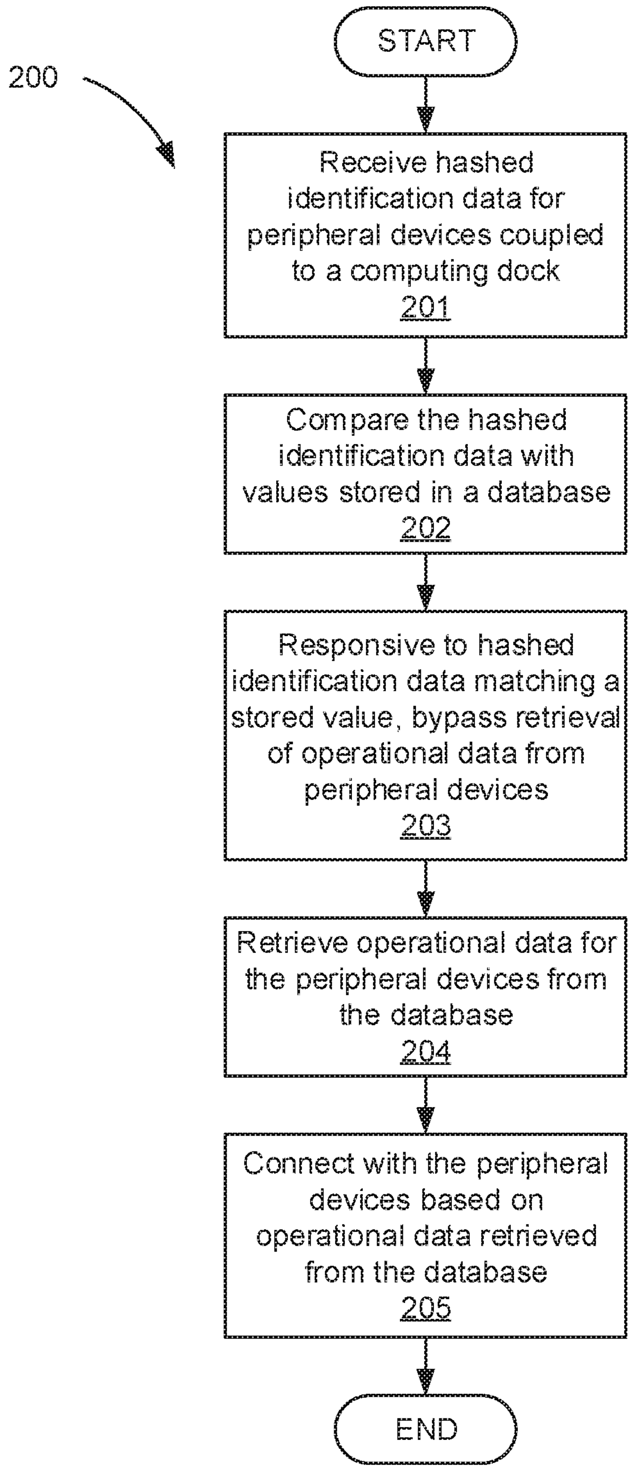
FIG. 2 is a flowchart of a method for connecting peripheral devices responsive to identification data matching, according to an example of the principles described herein.

FIG. 2 is a flowchart of a method (200) for connecting peripheral devices responsive to identification data matching, according to an example of the principles described herein. According to the method (200), the host controller (FIG. 1, 102) receives (block 201) hashed identification data of peripheral devices coupled to a computing dock. As described above, such information may be cryptographically hashed to prevent tampering with the information. The hashed identification data may be either a single value that identifies the combination of peripheral devices or may be multiple distinct values that each identify an individual peripheral device.

The host controller (FIG. 1, 102) compares (block 202) the hashed identification data with stored values to determine if the current combination of peripheral devices has previously been connected to the computing dock and for which operational data has previously been connected. As noted above, not finding a match is indicative of 1) the combination of peripheral devices not having previously been used with the computing dock or 2) the operational data having been purged for that combination of peripheral devices.

Responsive to the hashed identification data matching a stored value, the compute device (FIG. 1, 100) bypasses (block 203) the retrieval of operational data from the peripheral devices and instead retrieves (block 204) the operational data for the peripheral devices from the database. Such operations leverage data already collected and extracts the previously-collected data rather than collecting the data anew. Collecting the data from the peripheral devices is more time-consuming as compared to collecting the operational data from the database on account of the functions and transmissions of information between the compute device (FIG. 1, 100) and the computing dock and the peripheral devices. That is, collecting the operational data from the database bypasses the compute device-computing dock-peripheral device transmission channel for retrieving operational data.

That is, in the shortened operation, the device connection controller (FIG. 1, 104) provides the operational data to the drivers of the compute device (FIG. 1, 100). The drivers use this data to connect the peripheral devices to the compute device (FIG. 1, 100). As a particular example, during a full enumeration operation, a bus driver may call a first function and a second function to communicate with the peripheral device to get the operational data. This process of calling functions and waiting for information from the peripheral device may be time-consuming and inefficient. Accordingly, in the shortened operation, the device connection controller (FIG. 1, 104) provides the operational data to the bus driver from the database, which is a quicker operation. With the operational data, the bus driver does not call the first and second functions and can connect the peripheral devices without having called the first and second functions, thus providing a connection in a shorter amount of time.

Thus, the present method (200) presents a time savings and also reduces the processing load as less information is transmitted across the communication lines between the compute device (FIG. 1, 100) and the computing dock. With the information collected, the bus driver and other drivers connect (block 205) the compute device (FIG. 1, 100) with the peripheral devices based on operational data retrieved from the database.

Figure 3:
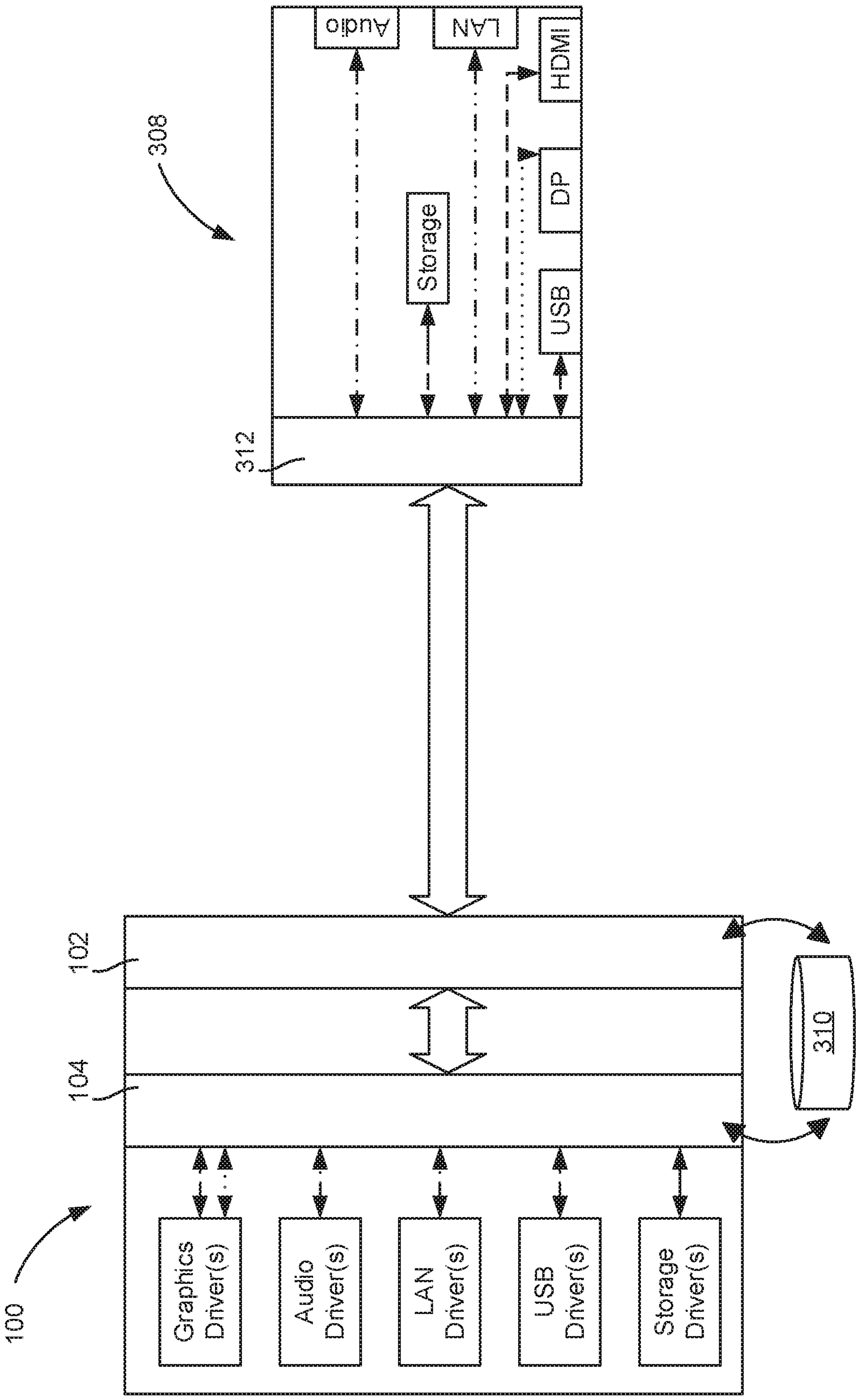
FIG. 3 is a block diagram of a compute device and a computing dock for peripheral device connection responsive to identification data matching, according to an example of the principles described herein.

FIG. 3 is a block diagram of a compute device (100) and a computing dock (308) for peripheral device connection responsive to identification data matching, according to an example of the principles described herein. As depicted in FIG. 3, the computing dock (308) includes a variety of ports, each to receive a connector of a peripheral device. The ports may be of a variety of types. For example, the ports may be a universal serial bus (USB) type-C port, a USB 2.0 port, a video graphics array (VGA) port, a digital video interface (DVI) port, DISPLAYPORT™, HIGH-DEFINITION MULTIMEDIA INTERFACE™ (HDMI) port, a local area network connection, and an audio jack etc. While specific reference is made to a few types of ports, the computing dock (308) may include any variety, and any number of ports.

Through such ports, a variety of peripheral devices may be coupled to the compute device (100). In this example, the computing dock (308) includes a dock controller (312) to detect the peripheral devices coupled to the computing dock (308) and provide identification data, which may be hashed identification data, for each peripheral device coupled to the computing dock (308). This identification data, whether hashed or not, is transmitted to the host controller (102) which receives the hashed data and compares it to previously received identification information stored in the database (310). Whether or not there is a match, each peripheral device is connected to a respective driver package. Note that in FIG. 3, a single box indicates a package of drivers to communicate with a particular device. It may be that each drive package may include multiple drivers. For example, a USB driver may include a USB bus driver and a USB device driver.

If there is a match, the device connection controller (104) retrieves the operational data stored in the database (310) and provides it to the driver(s) such that the compute device (FIG. 1, 100) may communicate with the respective peripheral device to provide the intended functionality. If there is not a match, the compute device (100), and specifically, the respective driver packages, retrieve the operational data via a series of transmissions from the compute device (100) through the computing dock (308) and to each individual peripheral device.

Figure 4:
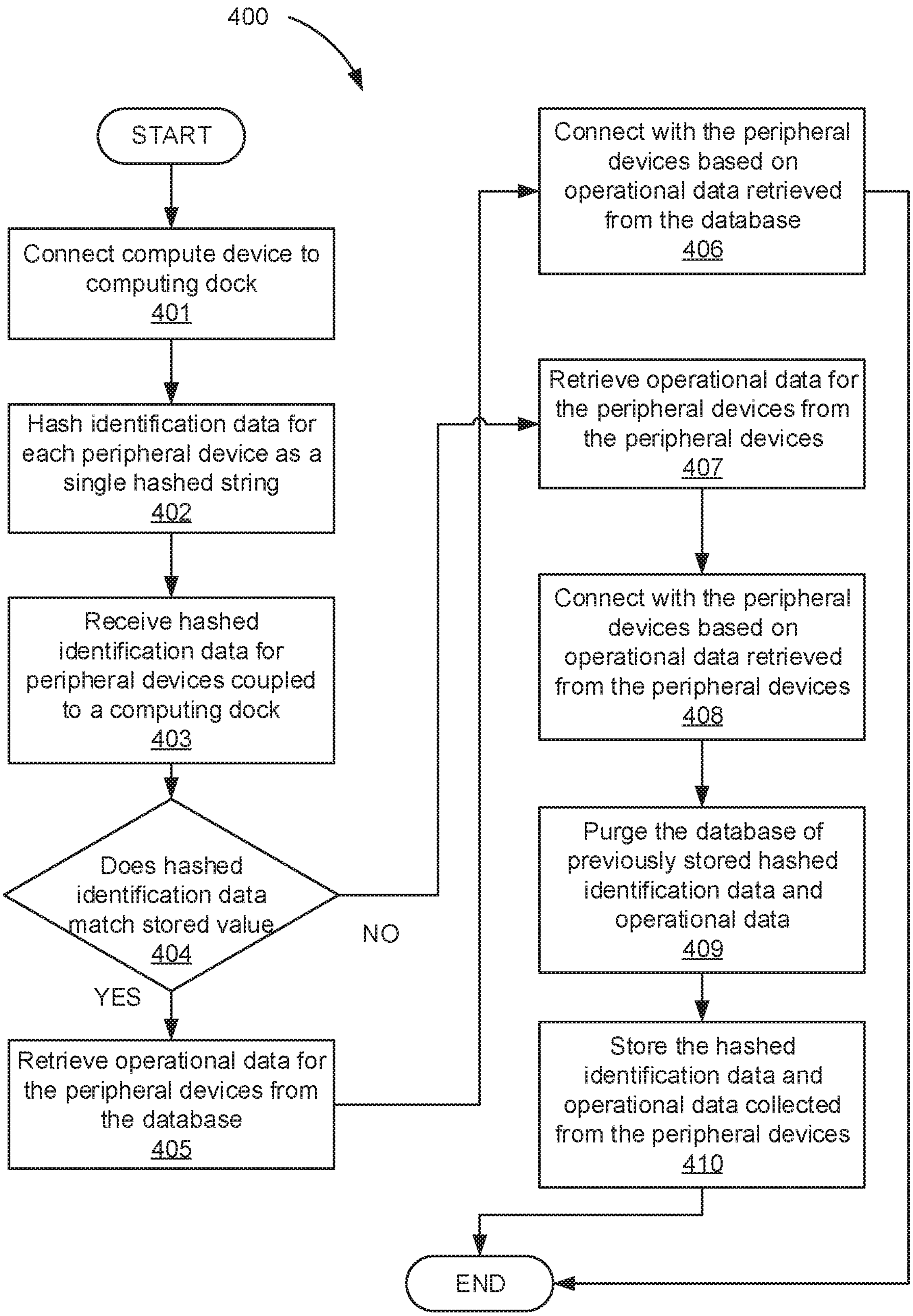
FIG. 4 is a flowchart of a method for connecting peripheral devices responsive to identification data matching, according to an example of the principles described herein.

FIG. 4 is a flowchart of a method (400) for connecting peripheral devices responsive to identification data matching, according to an example of the principles described herein. As described above, the identification data matching operation may be triggered by connection (block 401) of the compute device (FIG. 1, 100) to the computing dock (FIG. 3, 308). Responsive to this connection, the dock controller (FIG. 3, 312) hashes (block 402) identification data for each peripheral device coupled to the computing dock (FIG. 3, 308) into a single hashed string. The compute device (FIG. 1, 100) receives (block 403) the hashed identification data (block 403) and compares it to the stored values in the database (FIG. 3, 310). If the hashed identification data does match a stored value (block 404, determination YES), operational data is retrieved (block 405) from the database (FIG. 3, 310) and the compute device (FIG. 1, 100) is connected (block 406) to the peripheral devices based on the operational data retrieved from the database (FIG. 3, 310). These operations may be performed as described above in connection with FIG. 2.

If the hashed identification data does not match a stored value (block 404, determination NO), the device connection controller (FIG. 1, 106) may retrieve (block 407) the operational data for the peripheral devices from the peripheral devices. As described above, this may include calling functions and requesting the operational data directly from the peripheral devices. The compute device (FIG. 1, 100) is connected (block 408) to the peripheral devices based on the operational data retrieved from the peripheral devices.

In an example, responsive to there not being a match between a collected hashed identification data and a stored value in the database (FIG. 3, 310), the database (FIG. 3, 310) is purged (block 409) of previously stored hashed identification data and operational data. Accordingly, during subsequent identification data matching operations, any collected hashed identification data is compared against a stored value representative of the immediately preceding combination of peripheral devices. For example, if a first stored value indicates a first combination of peripheral devices and a received hashed identification data does not match the first stored value, the first stored value, and associated operational data, is purged (block 409) and the newly collected hashed identification data is stored (block 410) as a second stored value. That is, when a match is not found, hashed identification data and the operational data collected (block 407) from the peripheral device is stored (block 410) in the database (FIG. 3, 310). In this example, a subsequently received hashed identification data is compared to the second stored value and not the first stored value. Thus, any match would indicate that the current combination of peripheral devices matches the most recently used combination of peripheral devices.

Figure 5:
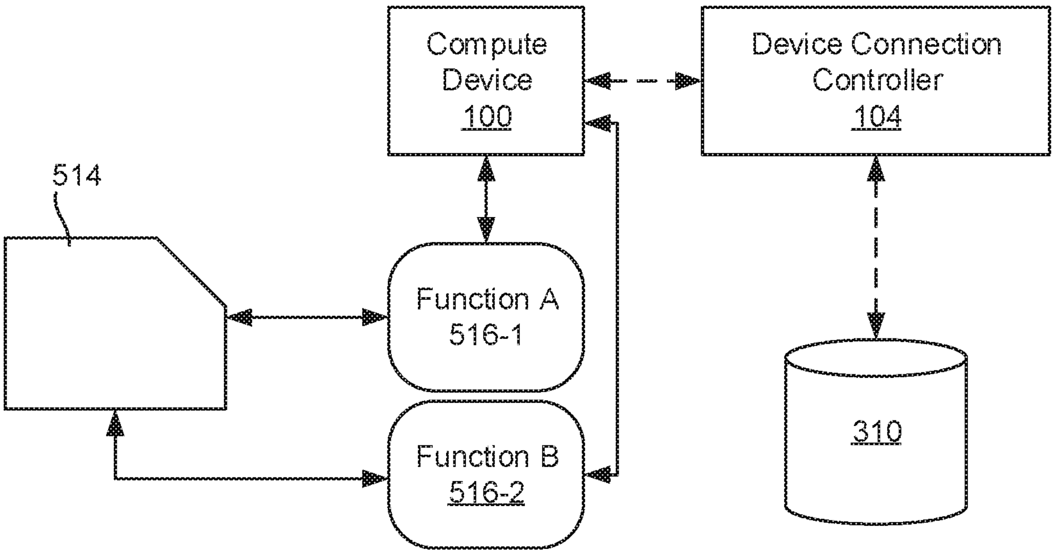
FIG. 5 is a diagram of peripheral device connection responsive to identification data matching, according to an example of the principles described herein.

FIG. 5 is a diagram of peripheral device (514) connection responsive to identification data matching, according to an example of the principles described herein. In the example depicted in FIG. 5, the full initialization operation is indicated in solid lines and a shortened operation is indicated in dashed line. As described above, responsive to no match being found between the identification data and the stored values in the database (310), the compute device (100) may retrieve the operational data directly from the peripheral device (514). As described, this may include the calling of functions (516-1, 516-2) to obtain the operational data.

By comparison, responsive to a match being found between the identification data and the stored values in the database (310), the device connection controller (104) may retrieve the operational data directly from the database (310) which may be a quicker process than obtaining it from the peripheral devices (514) themselves.

Figure 6:
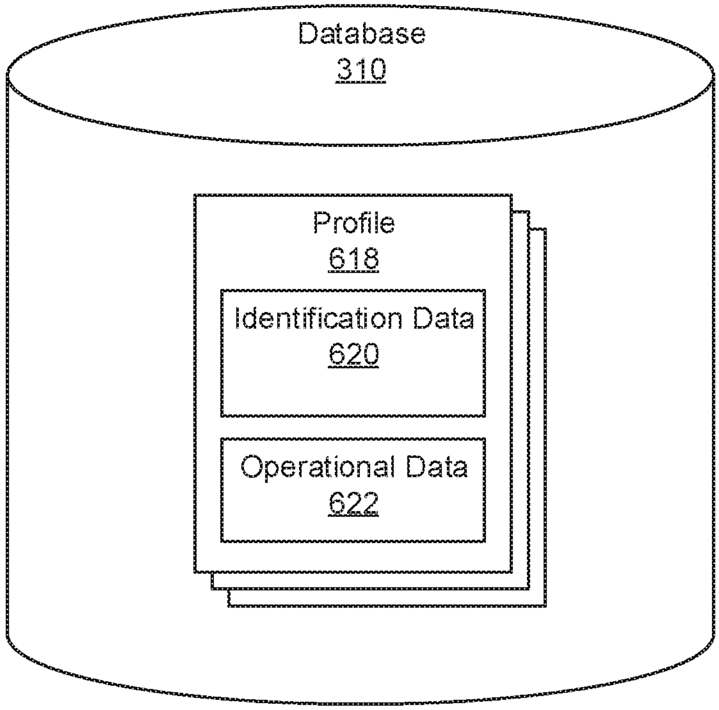
FIG. 6 is a diagram of the database for peripheral device connection responsive to identification data matching, according to an example of the principles described herein.

FIG. 6 is a diagram of the database (310) for peripheral device (FIG. 5, 514) connection responsive to identification data matching, according to an example of the principles described herein. As described above, the database (310) may include information to expedite the dock connection process between a compute device (FIG. 1, 100) and a number of peripheral devices (FIG. 5, 514). Specifically, the database (310) may store identification data (620), whether hashed or not, that received hashed data is compared against to determine if the combination of peripheral devices (FIG. 5, 514) currently connected to the computing dock (FIG. 3, 308) has previously been connected to the computing dock (FIG. 3, 308). The database (310) also includes the operational data (622) that is used to establish a working connection between the peripheral devices (FIG. 5, 514) and the compute device (FIG. 1, 100).

As described above, in some examples, responsive to a lack of a match between received identification data and stored identification data (620) previously collected, the stored identification data (620) and operational data (622) may be purged from the database (310). In another example, the previously collected identification data (620) and operational data (622) may be stored as a first profile (618) in the database (310). In this example, the newly received identification data and operational data may also be stored as a profile (618) in the database (310). That is, the database (310) may include a number of profiles (618), each profile (618) including identification data (620) for a different combination of peripheral devices (FIG. 5, 514) and operational data (622) for that combination. In this example, rather than the shortened operation being used when the current combination matches the most recently used combination, the shortened operation may be used if the current combination matches any previously used combination of peripheral devices (FIG. 5, 514).

Figure 7:
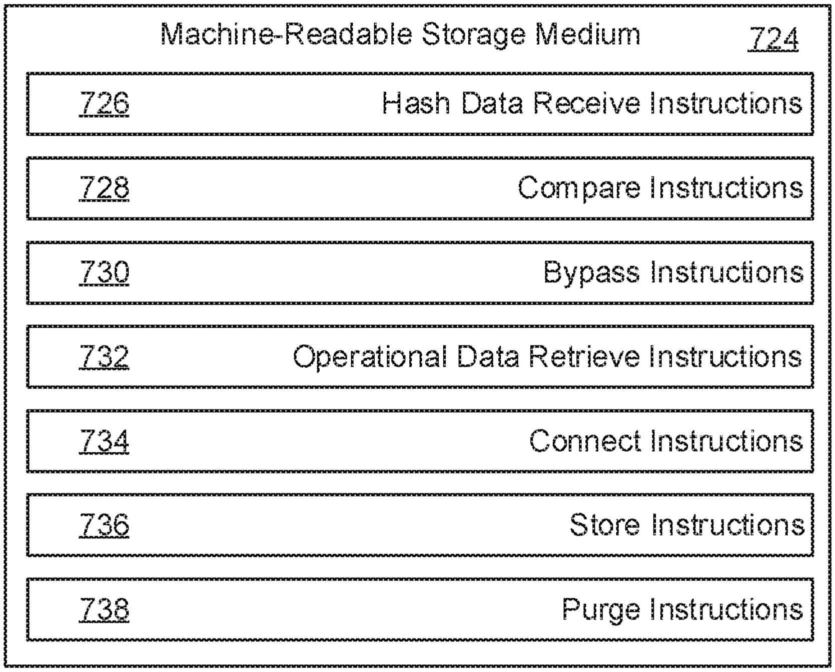
FIG. 7 depicts a non-transitory machine-readable storage medium for peripheral device connection responsive to identification data matching, according to an example of the principles described herein.

FIG. 7 depicts a non-transitory machine-readable storage medium (724) for peripheral device (FIG. 5, 514) connection responsive to identification data (FIG. 6, 620) matching, according to an example of the principles described herein. To achieve its desired functionality, a compute device (FIG. 1, 100) includes various hardware components. Specifically, a compute device (FIG. 1, 100) includes a processor and a machine-readable storage medium (724). The machine-readable storage medium (724) is communicatively coupled to the processor. The machine-readable storage medium (724) includes a number of instructions (726, 728, 730, 732, 734, 736, 738) for performing a designated function. In some examples, the instructions may be machine code and/or script code.

The machine-readable storage medium (724) causes the processor to execute the designated function of the instructions (726, 728, 730, 732, 734, 736, 738). The machine-readable storage medium (724) can store data, programs, instructions, or any other machine-readable data that can be utilized to operate the compute device (FIG. 1, 100). Machine-readable storage medium (724) can store machine readable instructions that the processor of the compute device (FIG. 1, 100) can process, or execute. The machine-readable storage medium (724) can be an electronic, magnetic, optical, or other physical storage device that contains or stores executable instructions. Machine-readable storage medium (724) may be, for example, Random-Access Memory (RAM), an Electrically Erasable Programmable Read-Only Memory (EEPROM), a storage device, an optical disc, etc. The machine-readable storage medium (724) may be a non-transitory machine-readable storage medium (724).

Referring to FIG. 7, hash data receive instructions (726), when executed by the processor, cause the processor to, receive hashed identification data of peripheral devices (FIG. 5, 514) coupled to a computing dock (FIG. 3, 308). Compare instructions (728), when executed by the processor, cause the processor to, compare the hashed identification data with values stored in a database (FIG. 3, 310), which stored values indicate a combination of peripheral devices (FIG. 5, 514) previously coupled to the computing dock (FIG. 3, 308) and for which operational data has been collected.

Bypass instructions (730), when executed by the processor, cause the processor to, responsive to the hashed identification data matching a stored value, bypass retrieval of operational data from the peripheral device (FIG. 5, 514). Operational data retrieve instructions (732), when executed by the processor, cause the processor to, responsive to the hashed identification data matching a stored value, retrieve operational data for the peripheral devices (FIG. 5, 514) from the database (FIG. 3, 310). Operational data retrieve instructions (732), when executed by the processor, cause the processor to, responsive to the hashed identification data not matching a stored value, retrieve operational data for the peripheral devices (FIG. 5, 514) from the peripheral devices (FIG. 5, 514).

Connect instructions (734), when executed by the processor, cause the processor to, responsive to the hashed identification data matching a stored value, connect with the peripheral devices (FIG. 5, 514) based on operational data retrieved from the database (FIG. 3, 310). Connect instructions (734), when executed by the processor, cause the processor to, responsive to the hashed identification data not matching a stored value, connect with the peripheral devices (FIG. 5, 514) based on operational data retrieved from the peripheral devices (FIG. 5, 514).

Store instructions (736), when executed by the processor, cause the processor to, store hashed identification data (FIG. 6, 620) and operational data (FIG. 6, 622) retrieved from the peripheral devices (FIG. 5, 514) to the database (FIG. 3, 310). Purge instructions (738), when executed by the processor, cause the processor to, responsive to the hashed identification data not matching a stored value, purge the database (FIG. 3, 310) of previously stored hashed identification data (FIG. 6, 620) and operational data (FIG. 6, 622).

In summary, using such a compute device, method, and machine-readable storage medium may, for example, 1) expedite a docking operation when a configuration of peripheral devices connected to the computing dock do not change and 2) avoids a lack of detection of connected peripheral devices which may result due to the intermediary computing dock. However, it is contemplated that the devices disclosed herein may address other matters and deficiencies in a number of technical areas, for example.

What is claimed is:

1. A compute device, comprising:
- a memory;
- a database, stored in the memory, to store values representing different combinations of peripheral devices previously physically connected to a computing dock;
- a host controller communicatively coupled to the database, the host controller to:
  - receive, via the computing dock, identification data comprising a hashed value representing a combination of peripheral devices physically connected to the computing dock, the identification data identifying a peripheral device;
  - compare the identification data with the values stored in the database; and
- a device connection controller communicatively coupled to the host controller, the device connection controller to:
  - retrieve, from the database, operational data for a peripheral device, based on a match between the identification data and at least one of the values; and
  - establish, based on the operational data, a connection with the peripheral device via the computing dock; and
  - bypass, when the identification data matches at least one of the values stored in the database, a full enumeration and initialization operation for the peripheral device; and
- one or more hardware processors that include the host controller and the device connection controller.

2. The compute device of claim 1, wherein:
- the database comprises a number of profiles; and
- each profile comprises:
  - a stored value corresponding to the identification data of a respective combination of peripheral devices; and
  - operational data for the peripheral devices of the respective combination.

3. The compute device of claim 1, wherein the stored values comprises identification data for the most recently used combination of peripheral devices physically coupled to the computing dock.

4. The compute device of claim 1, wherein the host controller is further to:
- receive, from the computing dock, a single hashed string representing identification data for multiple peripheral devices connected to the computing dock.

5. The compute device of claim 1, wherein the device connection controller is further to store, in the database when the identification data does not match any of the values stored in the database, the identification data and operational data retrieved from the peripheral device.

6. The compute device of claim 1, wherein the device connection controller is further to:

purge, from the database when the identification data does not match any of the values stored in the database, previously stored identification data and operational data.

7. The compute device of claim 1, wherein the device connection controller is further to:

establish connections with multiple peripheral devices based on a single retrieval of operational data from the database when identification data for the multiple peripheral devices matches at least one of the values stored in the database.

8. The compute device of claim 1, wherein the computing dock comprises:

a dock controller, the dock controller comprising a hardware processor and a memory to:

detect the peripheral devices coupled to the computing dock; and provide identification data for each peripheral device coupled to the computing dock;

a plurality of peripheral ports, each peripheral port of the plurality of peripheral ports to receive a connector of a peripheral device; and a host port by which the compute device is physically connected to the computing dock.

9. A method, comprising:

storing, in a database of a compute device, values representing different combinations of peripheral devices previously physically connected to a computing dock;

receiving identification data that identifies a peripheral device physically connected to a computing dock, based on the compute device being physically connected to the computing dock, the identification data comprising a hashed value representing a combination of peripheral devices physically connected to the computing dock;

comparing, in response to receiving the identification data, the identification data with the values;

retrieving, from the database when the identification data matches at least one of the values stored in the database, operational data for a peripheral device;

establishing, based on the operational data, a connection with the peripheral device via the computing dock; and bypass, when the identification data matches at least one of the values stored in the database, a full enumeration and initialization operation for the peripheral device.

10. The method of claim 9, further comprising:

retrieving operational data for the peripheral device from the peripheral device-via the computing dock in response to a determination that the identification data does not match any of the values stored in the database.

11. The method of claim 10, further comprising storing, in the database, hashed identification data and operational data collected from the peripheral devices.

12. The method of claim 11, further comprising purging the database of previously stored hashed identification data and operational data.

13. The method of claim 11, further comprising:

storing the hashed data identification data and operational data collected from the peripheral devices as a first profile in the database; and retaining previously stored hashed identification data and operational data as a second profile in the database.

14. A non-transitory machine-readable storage medium encoded with instructions executable by a processor, the machine-readable storage medium comprising instructions to, when executed by the processor, cause the processor to:

store, in a database of a compute device, values representing different combinations of peripheral devices previously connected to a computing dock;

receive identification data that identifies a peripheral device physically connected to a computing dock, based on the compute device being physically connected to the computing dock, the identification data comprising a hashed value representing a combination of peripheral devices physically connected to the computing dock;

compare, in response to receiving the identification data from the peripheral device, the identification data with the values;

retrieve, from the database when the identification data matches at least one of the values stored in the database, operational data for the peripheral device;

establish, based on operational data, a connection with the peripheral device via the computing dock; and bypass, when the identification data matches at least one of the values stored in the database, a full enumeration and initialization operation for the peripheral device.

15. The non-transitory machine-readable storage of claim 14, wherein the identification data comprises a hashed value representing a combination of peripheral devices physically connected to the computing dock; and wherein the identification data comprises data selected from the group consisting of a device identifier, a vendor identifier, a device serial number, and a device name.

16. The compute device of claim 1, wherein the operational data comprises protocol-specific information for establishing communication between the compute device and the peripheral device.

17. The compute device of claim 16, wherein the protocol-specific information includes at least one of:

a protocol version,
extended display identification data,
bandwidth information,
device address,
resource allocations,
device-specific settings,
Universal Serial Bus (USB) type,
supported protocols,
transmission speed,
class code, or
vendor identification.

18. The compute device of claim 1, wherein the hashed value is generated by the computing dock.

* * * * *